Figure 1:
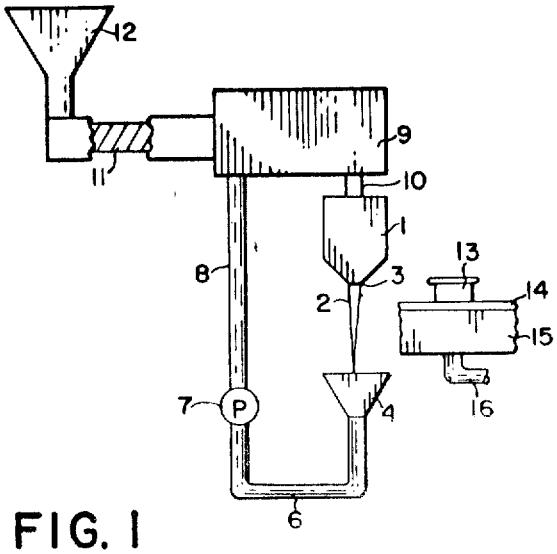
Figure 2:
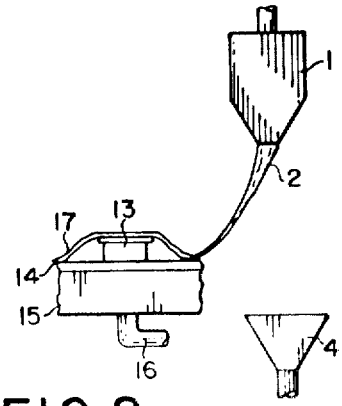
Figure 3:
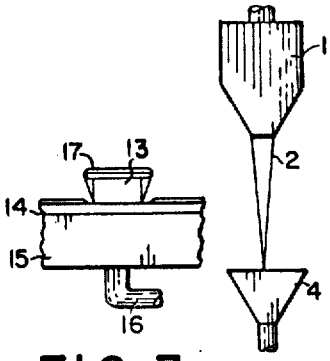
Figure 4:
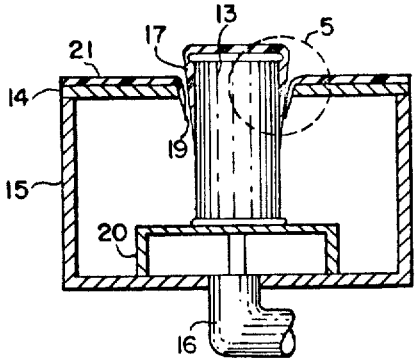
Figure 5:
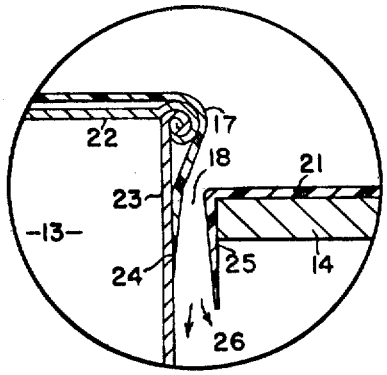
Figure 6:
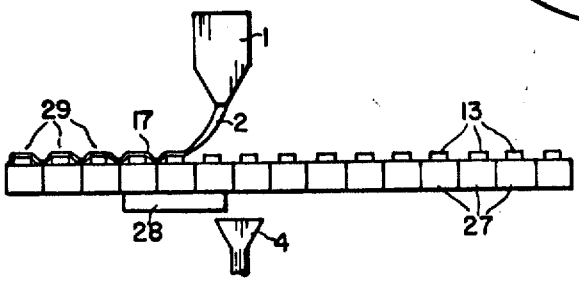
Figures 7, 8:
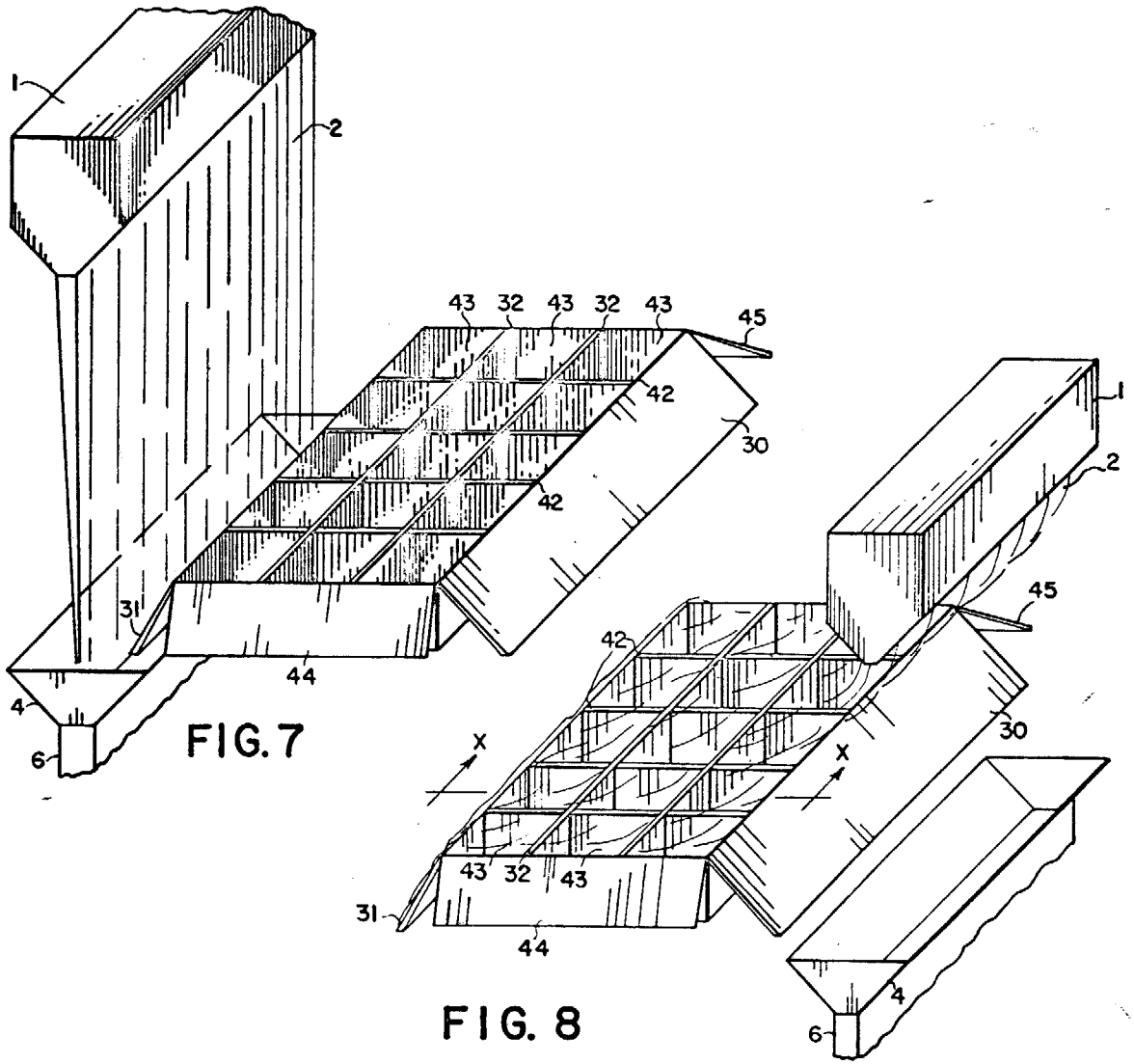
Figure 9:
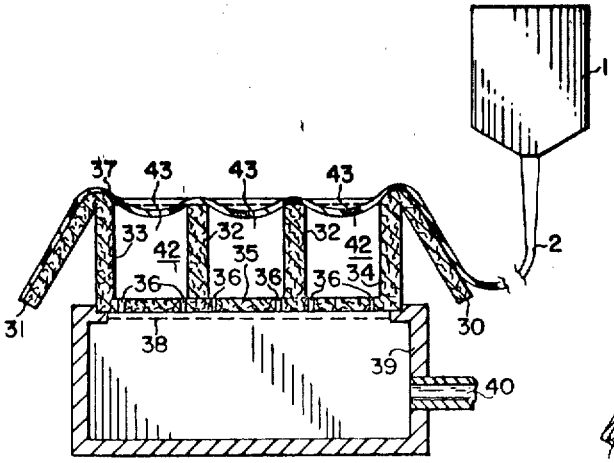
Figure 10:
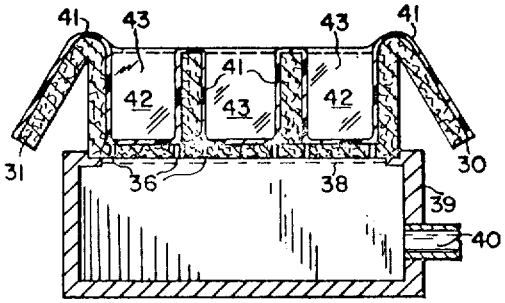
Figure 11:
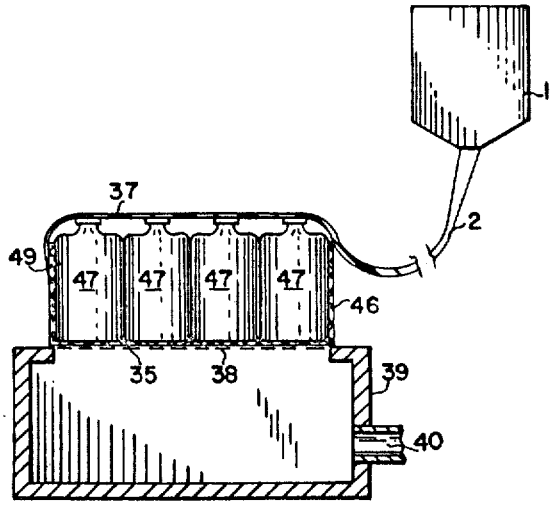
Figure 12:
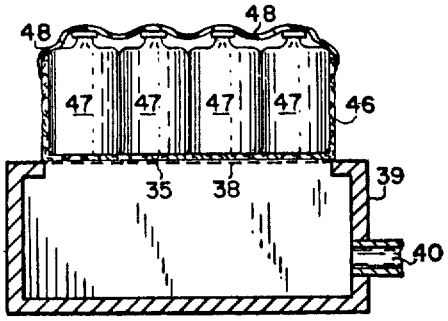

427-294 313
FIP8003 OR T 857,041 SR DEC 24 1968
IVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1038

T 675,413 T 857,041

METHOD FOR APPLYING PLASTIC COVERS TO CONTAINERS

Rex Eells and David E. Stooksbury, both of P.O. Box 511, Kingsport, Tenn. 37662

Continuation-in-part of application Ser. No. 622,866, Mar. 10, 1967. This application Oct. 16, 1967. Published Dec. 24, 1968

Class 117—105.3

3 Sheets Drawings. 23 Pages Specification

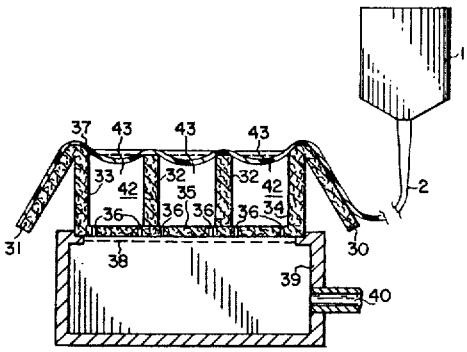

FIG. 9

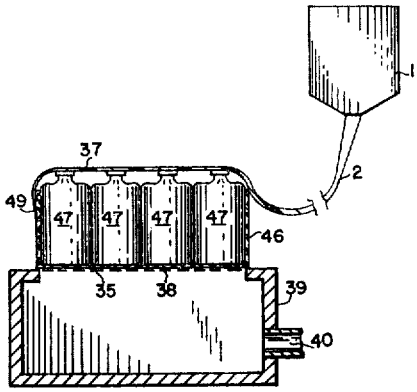

FIG. 11

A method of applying a coating to the upward and outward facing portions of a container which comprises (1) supporting a container so that the portions to be coated are freely accessible to a falling curtain of coating material and that a reduced air pressure can be applied to the lower portion of the container; (2) passing the supported container through a falling curtain of viscous, molten, thermoplastic material to apply thereto a continuous coating of said thermoplastic material; and (3) reducing the air pressure around the container to pull the molten thermoplastic material down over the upward and outward portion of the container. The method can be utilized to line containers having internal compartments. The method can also be utilized to provide a cover for a carton open at the top and containing articles inside the carton.

427-294 3/3
FIP8003 OR T 857,041 SR

Draw page 1 of 3

Rex Eells
David E. Stooksbury
INVENTORS

BY William J. French
George P. Chandler
ATTORNEYS 427-294 3/3 SR

FIP8003 OR T 857,041 Draw page 2 of 3

Rex Eells
David E. Stooksbury
INVENTORS

BY William T. French
George P Chandler
ATTORNEYS 427-294 3/3 SR
FIP8003 OR T 857,041 Draw page 3 of 3

Rex Eells
David E. Stooksbury
INVENTORS

BY William T. French
George P. Chandler
ATTORNEYS